US012767595B2

(12) United States Patent
Bogas et al.

(10) Patent No.: US 12,767,595 B2
(45) Date of Patent: Oct. 20, 2026

(54) PROCESS FOR SEPARATING THE COMPONENTS OF HARDENED CONCRETE WASTE FOR PRODUCING RECYCLED CEMENT

(71) Applicants: INSTITUTO SUPERIOR TÉCNICO, Lisbon (PT); INSTITUTO POLITÉCNICO DE SETÚBAL, Setúbal (PT); UNIVERSIDADE DO PORTO, Oporto (PT)

(72) Inventors: José Alexandre De Brito Aleixo Bogas, Lisbon (PT); Manuel Francisco Costa Pereira, Lisbon (PT); Ana Mafalda Saldanha Guedes, Setúbal (PT); Ana Chambel Carriço, Lisbon (PT); Susana Hu, Lisbon (PT); Rui Jorge Coelho de Sousa, Oporto (PT)

(73) Assignees: INSTITUTO SUPERIOR TECNICO, Lisbon (PT); INSTITUTO POLITECNICO DE SETUBAL, Setubal (PT); UNIVERSIDADE DO PORTO, Oporto (PT)

( * ) Notice: Subject to any disclaimer, the term of this patent is extended or adjusted under 35 U.S.C. 154(b) by 912 days.

(21) Appl. No.: 17/801,829

(22) PCT Filed: Feb. 23, 2021

(86) PCT No.: PCT/PT2021/050005

§ 371 (c)(1),
(2) Date: Aug. 24, 2022

(87) PCT Pub. No.: WO2021/173022

PCT Pub. Date: Sep. 2, 2021

(65) Prior Publication Data

US 2023/0081205 A1 Mar. 16, 2023

(30) Foreign Application Priority Data

Feb. 24, 2020 (PT) ........................................ 116130

(51) Int. Cl.
*C04B 7/24* (2006.01)
*B03C 1/00* (2006.01)
(Continued)

(52) U.S. Cl.
CPC .............. *C04B 7/246* (2013.01); *B03C 1/002* (2013.01); *B03C 1/18* (2013.01); *B03C 1/30* (2013.01); *B03C 2201/20* (2013.01)

(58) Field of Classification Search
CPC .. B03C 1/002; B03C 1/10; B03C 1/16; B03C 1/18; B03C 1/30; B03C 2201/20; C04B 7/246; Y02P 40/10; Y02W 30/91
See application file for complete search history.

(56) References Cited

U.S. PATENT DOCUMENTS 3,487,939 A * 1/1970 Keeley ...................... B03C 1/04 210/222
7,258,737 B2 * 8/2007 Chang ..................... C04B 28/18 106/713
(Continued)

FOREIGN PATENT DOCUMENTS

| | | | |
|---|---|---|---|
| CN | 100391881 | C | 6/2008 |
| DE | 102006049836 | A1 | 4/2008 |
| JP | 2001302292 | A | 10/2001 |

*Primary Examiner* — Michael Mccullough
*Assistant Examiner* — Kalyanavenkateshware Kumar
(74) *Attorney, Agent, or Firm* — Rivka Friedman

(57) ABSTRACT

The present invention lies within the field of construction materials and concerns a process for separating the constituents of hardened concrete, with the aim of extracting the cementitious fraction to be used in the production of thermoactivated recycled cement, involving the essential steps of: (a) crushing the concrete waste; (b) screening the crushed
(Continued)

material to separate material smaller than about 1 mm; (c) fragmenting material larger than 1 mm; (d) screening material smaller than 1 mm into various granulometric fractions; (e) high intensity magnetic separation of the material; (f) grinding of the cementitious fraction resulting from the magnetic separation in the previous step to a size that allows its efficient thermoactivation; and (g) obtaining a thermoactivated recycled cement.

14 Claims, 4 Drawing Sheets

(51) Int. Cl.
*B03C 1/18* (2006.01)
*B03C 1/30* (2006.01)

(56) References Cited

U.S. PATENT DOCUMENTS

| | | | | |
|---|---|---|---|---|
| 2013/0313167 | A1* | 11/2013 | Vandemierden | B07B 15/00 209/214 |
| 2018/0036803 | A1* | 2/2018 | Yamamoto | C22B 1/24 |
| 2018/0056344 | A1* | 3/2018 | Wei | B02C 23/38 |

* cited by examiner

PROCESS FOR SEPARATING THE COMPONENTS OF HARDENED CONCRETE WASTE FOR PRODUCING RECYCLED CEMENT

BACKGROUND TO THE INVENTION

The present invention lies within the field of construction materials and relates to a process for separating the constituents of hardened concrete with the aim of extracting the cementitious fraction to be used in the production of thermoactivated recycled cement, involving, in a first phase, the separation process, with various stages of mechanical and/or thermal separation, which aims to release the constituents of the concrete, and in a second phase the purification of the cementitious matrix, using the technique of high intensity magnetic separation.

The separation process, the subject of the present invention, is based on the paramagnetic characteristics of the cementitious matrix that differentiate it from the other constituents of the concrete, with it being possible to reach high levels of separation efficiency, as well as reducing the environmental impact and the application and operating costs.

Additionally, the process that is the subject of the present invention makes it possible to achieve recycled aggregates of better quality and is equally applicable to other binders with paramagnetic characteristics.

The separation process of the present invention is based on the paramagnetic characteristics of the cement for its recovery, and it can also be used to clean aggregates or to obtain recycled aggregates of better quality, and may also be useful for other purposes and industries. Furthermore, the procedure is also applicable to other binders with ferromagnetic or ferrimagnetic elements in their constitution, as is the case of magnetite.

Construction and demolition waste (C&DW) generally include cementitious materials, ceramics, sand, powders, wood, plastic, paper, metals and other components. CN107140903 applies in a first sorting stage, inorganic debris are separated from other C&DW. Light materials, such as plastic, paper and wood can be easily separated by air classifiers, suction methods, or other gravitational separation and screening methods. This separation can be carried out after a first crushing and screening stage. Ferrous metals, such as that from reinforced concrete reinforcement, can then be separated by conventional low intensity magnetic separators. These are relatively well-established steps in the initial separation processes and as such are not covered by the proposed procedure, which only concerns the next stage of separating concrete's constituents from C&DW that consists mainly of cementitious materials. The exception relates to ceramic materials, whose separation is more complex because their density is close to that of concrete.

In line with the new European environmental policies and directives that are based on conserving natural resources, waste recovery, and reducing greenhouse gas emissions, efforts are currently being made to reduce the environmental and economic impact of concrete production, aiming at more sustainable construction. In fact, concrete, which is still the second most-consumed product worldwide after water [1], is a source of environmental problems, since it involves the extraction and depletion of non-renewable natural resources, the management of large volumes of construction and demolition waste (C&DW) and the significant emission of greenhouse gases.

As set out in European Directive 2008/98/EC of the European Parliament and the Council, and transposed into national law through the Decree Law No 73/2011, an ambitious target has been set for 2020 whereby 70% of C&DW must be forwarded for reuse or recycling. Currently, C&DW accounts for about 50% of industrial solid waste, of which a not insignificant part is concrete waste [2]. It is therefore important to find new solutions for the efficient reuse of concrete waste; solutions which go beyond those already provided in Portuguese regulatory documentation, namely: ditch filling; construction of country paths and woodlands; use in backfill and bedding layer of support infrastructure; recycled aggregates for unbound pavement layers; and recycled coarse aggregates in hydraulic binder concrete. Low-demand uses for aggregates derived from concrete waste are, for example, strengthening foundations, road pavement base courses, and recycled non-structural masonry blocks, as referred to in CN108373280.

The production of concrete with recycled aggregates has been the subject of several research studies, aiming to contribute to the effective reuse of C&DW. However, one problem that has hindered the acceptance of these concretes in the construction market, particularly in structural solutions, stems from the large amount of paste adhered to the recycled aggregates, after the current processes of crushing concrete waste. Although it depends on the characteristics of the original concrete, the adhered paste generally helps to increase the water absorption in aggregates, lower bonding between aggregate-paste and concretes with lower workability and strength, as mentioned in CN107140903A. Thus, procedures designed to reduce the amount of adhered paste contribute to better quality recycled aggregates and concrete.

But even though recycled aggregates help to reduce waste disposal in landfills and to cut the consumption of natural waste, they do not significantly affect the problem of high CO2 emissions associated with concrete production. It should be noted that according to European directive 2009/29/EC of 23 Apr. 2009, reinforced in the 2015 Paris agreement, there is a commitment to reduce greenhouse gas emissions from 1990 levels by 30% in 2020 and 60-80% in 2050.

Cement production contributes more than 80% of CO2 emissions involved in the manufacture of concrete, representing more than 5% of annual anthropogenic CO2 emissions. Therefore, facing the threat that in the near future cement production will be subject to unaffordable environmental taxes, the industry and the scientific community have been working to find alternative solutions that lead to more ecologically and economically efficient and sustainable cements.

In this context, the production of recycled cements that involves reusing concrete waste is currently being investigated. The results that have been reported show that it is possible to produce recycled cements with strengths close to those obtained in other hydraulic binders, but using lower processing temperatures and involving significant reductions in the level of CO2 emissions.

One of the main restrictions to these cements being more widely used in the industry is related to the difficulties inherent to the treatment of concrete waste, particularly with regard to isolating the cementitious matrix from the other constituents of concrete. This is why most published works are still restricted to the study of recycled cements obtained directly from cement pastes previously produced in the laboratory. Several authors have concluded that acceptable levels of efficiency in recycled cements require the development of effective methods of separation which must be valid for concretes of different compositions.

In fact, separation is a fundamental step in concrete recycling since it enables both a more effective production of recycled cement, and a better reuse of the remaining constituents. Following what is recommended in recent European environmental programmes, particularly in terms of the sustainable management of natural resources and the implementation of an innovative circular economy for the use of construction materials, it is essential that the various constituents of concrete can be reused efficiently, which requires their prior separation.

Thus, the present invention aims to separate concrete waste by magnetic separation, exploiting the differences between the magnetic properties of cement and the other constituents of concrete. Quartz, feldspar and calcite, which are usually the majority minerals in aggregates, have diamagnetic characteristics, i.e. the electrons are grouped in pairs with antiparallel spins, leading to approximately null magnetic moments. These materials exhibit negative magnetic susceptibility, being weakly repelled in the opposite direction to the highest field strength.

Susceptibility values of $-6.2\times10^{-9}$ and $-4.8\times10^{-9}$ $m^3/kg$ are mentioned for quartz and calcite, respectively [3]. Cement, meanwhile, has paramagnetic characteristics in which the electronic structure has unpaired spins with antiparallel spins. This imbalance is sufficient for these materials to have positive magnetic susceptibility [3], being weakly attracted towards the magnetic field of higher intensity.

Gopalakrishnam et al. [4] report values of $11.4\times10^{-7}$ $m^3/kg$ for the mass susceptibility of anhydrous Portland cement, which confirms its paramagnetic characteristics. This positive susceptibility results essentially from the contribution of Fe2O3 (iron oxides) present in the ferrous phases of the cement, namely in C4 μF (tetracalcium aluminoferrate). In hardened cement, the presence of iron remains in the hydration products of these compounds.

In concrete's constituents of diamagnetic or paramagnetic nature, the magnetic force acting on them is directly proportional to the product of the induced magnetic field intensity and the field gradient, with this proportionality being dependent on the magnetic susceptibility and the volume of the material. That is, in addition to the field intensity, the magnetic force exerted on the particles during separation is strongly affected by the field gradient, which consists of the rate of spatial variation of the field intensity. Thus, due to the weak magnetic susceptibility of cement, only high intensity, high gradient separators are suitable for separating it. Examples are cross belt separators, induced roll separators, permanent roll separators, superconductor separators, or wet high gradient separators using ferromagnetic material matrices.

BACKGROUND TO THE INVENTION

Based on the separation methods developed by the mining industry, several processes of concrete waste separation have been suggested, essentially aiming only to obtain better quality recycled aggregates, not envisaging the reuse of the recycled cement. The methods that have been proposed can be grouped into mechanical separation techniques (crushing, impact, grinding, and screening), thermal separation, gravitational separation or a combination of these techniques.

Mechanical separation techniques consider different methodologies which may or may not involve the stages of crushing, impact, grinding, and wear. Studies suggest that crushing is more effective when it comes to recycling aggregates than impact action, since it leads to lower rates of broken aggregate particles [5]. Autogenous grinding or grinding in ball mills promotes wear and the consequent removal of the cementitious matrix adhered to the aggregates [6]. Another grinding technique consists of using mills with concentric rotating cylinders, in which the concrete particles are rubbed between the walls of both cylinders, which removes the fine elements of the paste. The efficiency of these methods is conditioned by the type of aggregate, with the finding that for aggregates of a softer nature (limestone) the fine fractions can be significantly contaminated by aggregate, which has also been subjected to wear and impact.

On the other hand, these techniques are associated with high energy consumption when reasonable separation levels are desired. Another disadvantage of these methods is the high level of noise that is generated. JP2009000606 states that when the goal is to clean and recover recycled aggregate, the ball mill can further lead to excessive grinding, particularly in softer aggregates.

In thermal separation techniques, concrete waste is first heated to a temperature between 300 and 600° C., taking advantage of the fact that the paste has different thermal expansion coefficients and mechanical properties from aggregates. After heating and cooling, the resulting material is subject to mechanical action or simple screening to separate the constituents. This method is more efficient in concretes where the difference between the quality of the paste and the aggregate is high, and may be less suitable for several concretes that are used in construction today. Furthermore, this technique is associated with high energy consumption, long processing times and the partial alteration of the physical and mechanical characteristics of its constituents.

It is known that for the separation efficiency to be high, the thermal action must be complemented with subsequent grinding steps [7], which increases the economic and environmental impact. *Sui* and Mueller [8] confirmed that significant amounts of the paste adhered to the aggregates could be removed at temperatures between 250 and 300° C., if followed by intense grinding. The main problems are the high energy consumption and the long processing time [9]. Temperatures between 300 and 350° C. are suggested by Al-Bayati, et al. [9], taking concretes with calcareous aggregates into account. According to the authors, the aggregate suffers significant impairment at higher temperatures. U.S. Pat. No. 7,258,737B2 describes the same phenomenon for temperatures above 400-500° C.

In concrete waste treated at 700° C., Muelder et al. [10] report only about 2% of paste adhered to the aggregates. The process involves crushing the concrete, followed by thermal treatment, vibratory screening and separation by air flow. In this case, aggregates may suffer significant impairment, besides CO2 emissions increasing by decarbonation in calcareous aggregates.

The microwave technique has recently been suggested, which takes advantage of the fact that aggregates have different dielectric characteristics from the cementitious paste [11]. Taking into consideration that the constituents of the concrete will respond to different heating rates, sufficient differential stresses can be generated to promote separation between the aggregate and the cementitious matrix. This technique seems to be more effective when the particles are cooled rapidly under water, which makes the process more difficult to implement. Nevertheless, in some tests maximum values of mortar removal in aggregates of only 47% have been reported [12].

Other methods, such as the use of ultrasound or electric pulse power, involve high energy consumption and are difficult to implement industrially. Gravitational separation methods that use liquids of a given density allow the direct separation of constituents, but are associated with high costs and complex decontamination and cleaning tasks for the separated product. Furthermore, gravitational separation in concrete is hampered by the proximity of the density of its constituents.

Chemical methods are also considered for the separation of concrete's constituents, such as pre-saturation treatments of aggregates with different acids in order to remove part of the adhered mortar. However, these methods destroy the adhered paste so that the cementitious material cannot be reused.

In short, despite research efforts, there is still no truly effective technique for separating concrete's constituents, especially considering attractive economic and environmental conditions. The various processes mentioned are mainly methodologies that aim to release the various constituents among themselves, and then proceed to the final stage of separation by simple screening, with or without the help of air classifiers, which usually results in high levels of contamination. Thus, to obtain a higher yield we must fine-tune this final separation stage, seeking a route for the best purification of each fraction, as proposed in the present invention.

Some patent applications in the technical field of the present invention contemplate mechanical, thermal, gravitational or chemical separation methods, and disregard magnetic separation except for the use of low intensity magnets for the initial separation of steel from concrete waste. In general, however, the proposed patents only aim to recover the aggregate and procedures that also aim at cement recovery are scarce.

The closest forerunners to this present invention are related to hardened concrete separation methodologies, in the following disclosures:

CN1857782A, which discloses a separation method based on a first crushing of the concrete, followed by a heat treatment of the concrete waste at 250-350° C. and then 3 to 10 minutes of grinding in a ball mill. Finally, the material less than 5 mm is subjected to further grinding and a kind of air sweeping tube where separation of the cement paste from the fine aggregated is attempted, differing from the present invention in that the separation of the cement particles is based only on grinding and classification by air flow;

CN108373280, discloses a method for separating the various constituents of concrete by grinding in a vertical mill and then in an eccentric mill to separate the aggregate and recover the cement. The proposed method involves a complex procedure of successive grinding operations after which the cement fines should be virtually uncontaminated by aggregate. The separation of the constituents is also aided by air circulation classifiers. The method focuses essentially on the liberation phase and does not effectively achieve the separation of cement from the other concrete fines;

U.S. Pat. No. 7,258,737B2, discloses, in a first stage of separation, a thermal treatment at 400-500° C., followed by grinding in a ball mill and screening, aiming to separate the various constituents of the concrete with a view to recovering the aggregate and regenerating the cement fraction. The fines fraction below 5 mm is subjected to an extra stage of grinding and screening with air classification, but recovery is not very efficient since the results report low calcium oxide (CaO) content in the fines mixture, indicating high contamination of the cement fraction by the ground aggregate.

The efficiency of these methods, which involve classification by air flow, is greatly influenced by the fact that the different constituents of the concrete have similar density but very varied granulometry and shapes. However, the method of the present invention is not affected by any of these factors, which are very difficult to avoid in the specific case of separating mortar or concrete waste.

The present invention finds even closer antecedents in WO2011/142663A1, which discloses a device for crushing concrete waste, which has been devised so as to attempt to maximise the separation of the various constituents of concrete. Basically, an everyday jaw crusher is adapted so as to increase the time the material spends in the jaw region and to induce a lighter mechanical action that results in rupture only at the weakest region of the aggregate-paste interface. The aim is to wear the aggregate away without significant impact rupture occurring. Although the method leads to greater separation between fines and coarse aggregates, it does not prevent the paste fines from being badly contaminated by aggregate. On the other hand, the equipment must always be suited to the size of the original waste and to the aggregates to be produced, as well as the composition of the concrete. The efficiency of the method also depends on the type of aggregate used, as it is more suitable for aggregates of a siliceous nature. The associated energy expenditure could also be high, since the method implies longer times spent in the crusher.

Several patent documents only aim at the recovery of concrete aggregates, discarding the mortar bonded to them without the effective separation of the cement fraction for subsequent reuse. The following disclosures are an example of such solutions:

KR101816678B1 discloses a procedure for improving the quality of recycled aggregate by removing adhered paste using multiple grinding processes in a roller mill, followed by screening in different granulometries. It should be noted that this method, only designed for cleaning the aggregate, leads to a large amount of non-separated fines, with the simultaneous presence of cement and aggregate;

CN107140903A, which discloses a method for recycling aggregates for concrete production, whereby, after primary crushing and removal of steel reinforcement by conventional magnetic separation, the concrete waste is subjected to secondary crushing (5-20 mm size), followed by 2 to 3 hours of autogenous grinding in a horizontal mill;

C101543828A discloses the production of concrete from urban construction debris, limited to obtaining recycled aggregates only through crushing and screening processes, thus reducing the efficiency of separating the paste fraction;

CN102276174A, which discloses a method for producing cement-based products, essentially with non-structural characteristics, such as masonry blocks. After a prior classification with removal of light materials (wood, plastic), the recycled aggregates are obtained directly from the construction waste through crushing, without any concern with separating the different constituents of the concrete;

CN105271858A discloses the preparation of recycled coarse aggregates from construction waste. After crushing and screening, the coarse aggregates are treated at 150-250° C. for 5-10 minutes and then ground for 10-20 minutes in a mill to remove adhered mortar. The surface dust of the aggregate is removed by washing;

JP2009000606A, which discloses a device and methodology for regenerating concrete waste using an innovative impact crushing system composed of a rotating cylindrical drum equipped with blades and toothed surfaces that promote the grinding and selective wear of the concrete waste. Then, after screening, the debris is placed in a mill consisting of toothed concentric cylinders which rotate eccentrically and perform additional grinding. The constituents of the concrete are separated with the aid of air classification, which allows the gravitational differentiation of the materials. Up to 70% of the cement fraction adhered to the aggregate is reported to be eliminated. The recovery of the cement fraction, as the objective of the present invention, is not envisaged;

KR101379913B1 discloses a method for obtaining recycled sand from concrete waste. After crushing, the concrete waste is fed into a chamber containing multiple bars that rotate in opposite directions, causing the materials to collide and pound together. The resulting powder is then subject to air circulation to perform the gravitational separation. Debris smaller than 50 mm in size is used as recycled sand, and the hardened cement fraction is not recovered;

KR20010067690A discloses a method for separating aggregate and cement from concrete waste. After crushing and washing the debris, the concrete is heated to 600-1000° C. and cooled in water. Finally, the debris is crushed in a roller crusher to separate the various constituents of the concrete. The high temperatures applied affect the characteristics of the concrete's constituents;

KR20020090354 discloses a device for recycling sand from concrete waste. The process includes crushing stages (by compression and by rollers), vibrating screening, impact crushing and a wet classification process;

CN203184239U discloses a method for recovering concrete waste by successive stages of screening and vibration.

The present invention solves the problem of low efficiency in the separation of cement from the remaining constituents of concrete in the already existing and disclosed solutions, as it proposes a method of high intensity magnetic separation for the purification of the fine fraction and separation of cement, with a high efficiency in separation and a lower economic and environmental impact.

The method of the present invention, which comprises an essential stage of magnetic separation, is much cleaner, involving low energy costs, reduced emission levels and no contamination or depreciation of the product obtained, as is the case, for example, with the methods of chemical separation, flotation or gravity separation using liquids of different density.

The present invention has the great advantage of being an innocuous separation process which meets the major objective that the separating and recycling techniques should be environmentally clean. It should be emphasised that it is easily adaptable to other mechanical and thermal separation techniques, provided that the principle and underlying philosophy of purification of the constituents of the concrete by magnetic differentiation is retained.

SUMMARY OF INVENTION

The subject of the present invention is thus a process of separating the components of hardened concrete sourced from construction and demolition waste to obtain a recycled cement, comprising the following essential steps:

a) carrying out at least one stage of crushing the hardened concrete waste until a material is obtained whose size is close to the maximum size of the aggregates constituting the concrete waste, generally between 20-32 mm;

b) screening the crushed material resulting from step a) with separation of material smaller than 1 mm;

c) fragmentation of the material larger than 1 mm resulting from step b) until at least 90% of the material below 1 mm is obtained;

d) screening of the material resulting from step c) less than 1 mm in size in granulometric fractions between 150 μm and 1 mm;

e) high intensity magnetic separation of material larger than 150 μm to remove the non-cementitious fraction by at least one pass through the magnetic separator;

f) grinding the cementitious fraction resulting from the magnetic separation of the previous step to a size that enables its efficient thermoactivation;

g) thermoactivation of the material obtained in the previous step to obtain recycled cement.

Depending on the type of fraction to be exploited in the separation process, the cementitious or the aggregate, it is possible to optimise the fragmentation stage of the screened material greater than about 1 mm in size through intermediate mechanical treatment stages or through a thermal treatment stage. The process described in a generalized way is represented in FIG. 2.

Thus, in a preferred form of the invention, to exploit the cementitious fraction, the material in step c) is fragmented by mechanical treatment through at least one cycle of grinding the material until a yield of more than 90% of the material smaller than about 1 mm is achieved. This mechanical treatment reduces the dimensions of the material.

Alternatively, if it is also intended to take advantage of the recovery of recycled aggregate, in step c) the sieved material greater than about 1 mm is subjected to a thermal treatment. Thus, in another form of implementing the invention, here with a view to exploiting the aggregates fraction too, the material in step c) is fragmented by means of a heat treatment, such that after cooling, the material subjected to the heat treatment is subjected to at least one grinding cycle.

The heat treatment is carried out at about 400° C. for about 2 hours and the grinding cycle is autogenous in a horizontal axis mill for about 30 minutes.

The thermal treatment causes the separation between the cement fraction and the aggregates through the differential tensions to which they are subjected, making it possible to obtain recycled aggregate with less adhered paste, as well as purified fine fractions, with the cement fraction scarcely contaminated by the fines produced by the crushing and grinding of the other constituents of the concrete.

In another form of implementing the invention, the material screened in step d) can be wet screened followed by drying at approximately 80° C. for about 2 hours. This additional step, which is also an alternative, removes dust on the surface of the particles, facilitating the magnetic separation process of step e).

In an advantageous form of the invention the material produced by the screening of step d) is magnetically separated by at least two passes through a high intensity magnetic separator. As the concrete consists mainly of aggregates, i.e. diamagnetic material, a higher speed of the dosing system and a larger opening of the splitter is used in the first pass through the magnetic separator to remove the largest possible percentage of aggregates. In the next passes, the cementitious material is purified using slower speeds and narrower openings. This methodology allows the separation system to perform better, since it involves a smaller volume of material to be separated.

In an alternative form of the invention, after at least one crushing step of the concrete waste according to step a), a first high intensity magnetic separation takes place to remove ceramic waste with paramagnetic characteristics, in particular red clay waste which has large percentages of iron oxides in its constitution.

In an alternative form of the invention, the material resulting from the mechanical or thermal treatment is subjected to selective magnetic separation with at least one pass in the high intensity magnetic separator to remove the residual fine ceramic debris, thus achieving further purification of the cementitious fraction. Other non-magnetic waste, such as glass, is also effectively separated through the diamagnetic fraction.

To increase the separation efficiency and ensure the continuity of the process, several permanent rolls can be arranged sequentially.

DETAILED DESCRIPTION OF THE INVENTION

Figure 1:
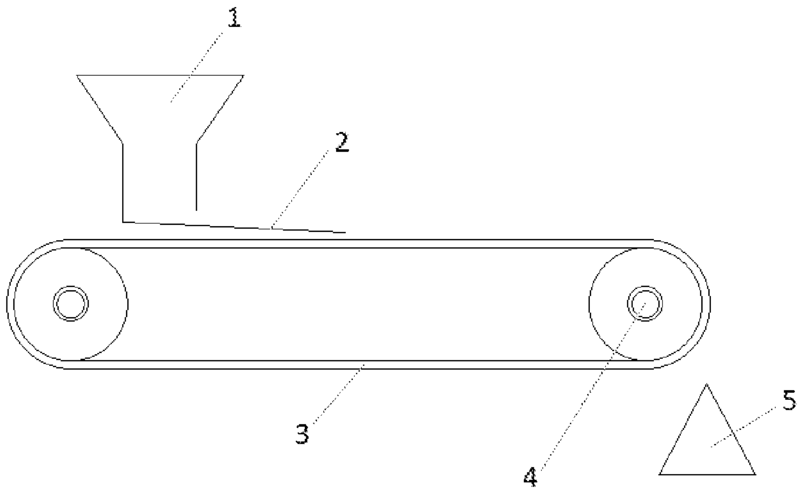
FIG. 1—schematic representation of the permanent magnetic roll separation equipment consisting of a feeder (1), a vibrating tray (2) that deposits the material on a conveyor screen (3), which is then separated by means of a permanent magnetic roll (4) and a splitter (5).
Figure 2:
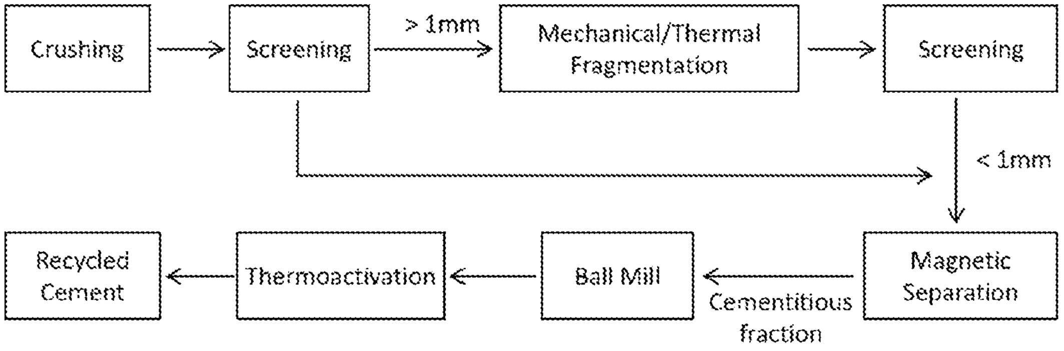
FIG. 2—generalized schematic representation of the separation of constituents of concrete waste.

The various configurations described below are applicable to different types of concrete waste, resulting from concretes of different compositions containing various types of aggregate of a distinct nature, calcareous and/or siliceous. During magnetic separation, some contamination of other magnetic materials that may be present in the aggregates can always occur, such as ferromagnesian minerals, for example, amphiboles or pyroxenes, but in general their content is not significant.

The crushing stages in the present invention can be carried out in a jaw crusher or in conventional cone crushers, and can also be carried out by other mechanical means that aim at better optimization of the process of releasing the different constituents of the concrete.

In an advantageous form of the invention, high-intensity magnetic separation is performed dry with permanent rolls made from rare-earth magnets and allowing field intensities at their surface exceeding 1 T. The selected rare-earth magnets could be neodymium-iron-boron, as they exhibit excellent magnetic properties, high productivity and energy efficiency.

For a better understanding of the invention it is important to explain the configuration and operation of a magnetic separator with permanent rolls. According to FIG. 1, the magnetic separator used in a form to implement the present invention includes a feeder (1) and a vibrating tray (2) that deposits the material on a conveyor screen (3), which conducts the material to a permanent magnetic roll (4) that will exert on the paramagnetic particles of the cementitious fraction a magnetic force opposing the centrifugal force in order to deflect their trajectory. The trajectory of the diamagnetic particles is not altered, however, which allows the separation of the magnetic material from the non-magnetic material through the adjustable divider (5) located at the base of the roll (4). The divider (5) opening and the feed speed are adjustable depending on the thickness of the conveyor screen (3), the characteristics of the magnetic roll (4) and the granulometry and magnetic susceptibility of the material.

In permanent magnetic roll separation, the high gradients required for higher magnetic forces and efficient separation are ensured by optimising the configuration of the separation rolls to allow the creation of a non-uniform field.

For example, the rolls can consist of discs or rings of permanent magnets interrupted at intervals with steel discs. The arrangement of the poles is optimised so that alternating polarity patterns are generated. The permanent rings are positioned so that the faces with the same polarity are side by side.

With regard to the diameter of the rolls (4) these can have a diameter greater than 76 mm. With the increase of the diameter of the roll (4), the separation efficiency increases, since the particles spend a longer time in the magnetic field. Thus, in a preferred form of the invention the said rolls (4) have a diameter of 300 mm since they enable greater efficiency.

Since there is a sharp drop in field strength with distance to the roll (4) surface, low thicknesses of less than 1-2 mm are recommended for the conveyor screen (3) for a minimum thickness of about 0.12 mm.

Depending on the particle size and the characteristics of the roll, the yield is variable. For example, for particles smaller than about 1 mm in size, yields of 15-30 kg/h per metre of screen width of 1.5 mm thickness have been achieved on a laboratory machine with a permanent roll 76 mm in diameter and about 1 T of field intensity at its surface. However, magnetic rolls can reach up to about 300 mm diameter and 2 T field strengths at their surface, thereby improving the separation yield.

In permanent magnetic roll separation, the particle size must be reduced and the particle granulometric spectrum narrowed because magnetic separation is affected by the shape and size of the particles. Therefore, the material must be pre-screened into different particle size fractions before proceeding with magnetic separation. To make sure that the various particles are equally affected by the magnetic force induced by the roll, it is important that the feeding is carried out in a monolayer, which should be ensured by a vibrating feeding system with adjustable opening.

In another embodiment of the invention, the magnetic separation can be performed by induced rollers, in which a metal alloy laminated rotor rotates between the polar parts of an electromagnet, inducing high magnetic field gradients and intensities, and thus bringing about the separation of paramagnetic materials of very weak magnetic susceptibility. A device with a capacity of up to 2 T has been successfully tried by the inventors of the present invention in the separation of concrete waste, for particles between 250 μm and 1 mm.

In another form of implementation of the invention the magnetic separation can be performed by high intensity, wet gradient magnetic separators, which use a matrix of ferromagnetic material of varied geometric shapes in order to produce high gradients. In order to have high performance and efficiency, ensuring continuous operation, only carousel separators should be of interest. However, the wet process may also have the advantage of protecting the ground material from eventual carbonation, which tends to decrease the reactivity of the final product (recycled cement).

High intensity magnetic separation can also be performed by another type of magnetic separator, following the same philosophy underlying the present invention.

Finally, the grinding of the paramagnetic fraction obtained from the magnetic separation; that is, the cementitious fraction should be ground until an average particle size lower than about 125 μm is obtained, which allows a more efficient reactivation of the cementitious fraction.

Some examples are described below that have been implemented in the separation of concrete constituents, according to the essential features of the method of the present invention.

The method of the present invention starts after a first crushing and sorting, in which the construction and demolition waste essentially consists of concrete debris and ceramic materials up to about 250 mm in size.

Example 1

Figure 3:
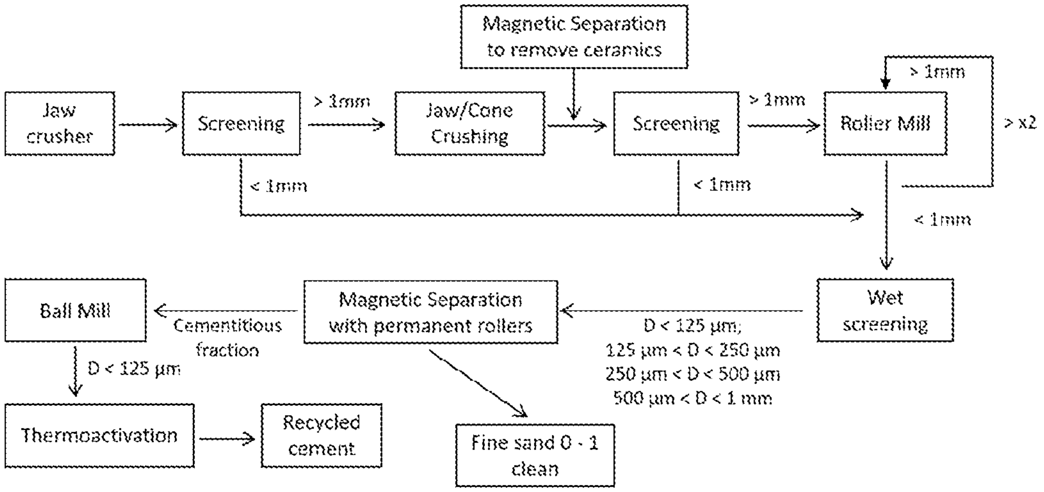
FIG. 3—schematic representation of the separation of the constituents of concrete waste with a view to recovering the cementitious fraction, as described in Example 1 of the detailed description of the invention.

The example described below is shown in FIG. 3 and aims to make use of the cementitious fraction of concrete waste.

In a first stage, the materials are subjected to a crushing process in jaw crushers, where the material is reduced to dimensions below about 20 mm. The material is then screened so that the material below 1 mm is separated from the rest of the waste. Any material larger than 1 mm is then crushed in a smaller jaw crusher, allowing the final waste to be smaller than 12 mm.

In order to eliminate ceramic waste, the material is subjected to a first stage of high intensity magnetic separation. For this, a permanent roll with about 1 T on the roll surface is used and it is found that the separation is very effective for debris up to 8 mm in size (over 97% separation), though it becomes slightly more contaminated between 8 and 12 mm (over 90% separation). This step can also be carried out at a later stage, after grinding the material in the roller mill. For very fine particles, the magnetic separation will have to be selective, isolating the ceramic material from the cementitious material, which are associated with different magnetic susceptibilities.

After the crushing and separation of the ceramic material, the debris above 1 mm is passed at least twice through a roller mill system. It has been ascertained that 2 passes ensure about 93% of the material below 1 mm, increasing to levels of 98% separation if another pass is run (the efficiency depends on the adjustment of the rollers and the feed speed). In brief, for 3 passes the material wastage is less than 2%. At the end, the material below 1 mm yielded by the various mechanical separation processes is screened into particle granulometric fractions of <150 μm; 150-250 μm; 250-500 μm and 500 μm−1 mm. This separation into different fractions is important for magnetic separation. Subsequently, the material above 150 μm, divided into the different fractions, is subjected to the magnetic separation procedure by high intensity permanent rolls. Since magnetic separation is affected by the presence of very fine particles and by any dust on their surface, left there by the previous mechanical crushing and grinding processes, the material undergoes a wet sieving followed by drying at 80° C. before this procedure is carried out.

At this stage, taking advantage of the paramagnetic characteristics of cement, the cementitious matrix is isolated from the other constituents of the concrete. In the presence of the magnetic roll, the cement particles are affected by the magnetic force that competes with the centrifugal force, and so the trajectory of the particles suffers a deflection. Meanwhile, the non-magnetic aggregate particles tend to present a more open trajectory, which makes it possible to separate these constituents. At this stage, other diamagnetic particles, such as the glass in C&DW are also separated from the cement, which further highlights the efficiency of the proposed separation method since it is very hard for gravitational methods to extract this fraction.

As the concrete waste is mostly composed of aggregate (non-magnetic material), an inverse methodology is chosen, where the first pass aims at eliminating the non-magnetic material (greater opening in the splitter and greater speed in the material dosing system, FIG. 1).

At a later stage, the material retained as magnetic is successively purified, involving at least one further pass on the magnetic roll for a smaller opening and slower feed speed. These rolls can be arranged sequentially, which is quite easy to implement at industrial level.

As a reference, for a roll of 76 mm diameter and about 1 T of field intensity on its surface and a screen 1.5 mm thick, the following approximate separation yields (mass of material separated (kg) per unit of time (h) and per metre of conveyor screen width) were obtained: fraction 150-250 μm−16 kg/(h.m); 250-500 μm−24 kg/(h.m); 500 μm−1 mm−32 kg/(h.m). The fraction below 150 μm, which cannot be separated, means about 10-15% of the mass of the concrete, depending on the fine-tuning in crushing and grinding. Since this material can contain about 15-20% cement in its composition, and the amount of cementitious matrix in the source concrete is about 18%, the cement content in this fraction could amount to about 10-15% by mass of the initial cement in the concrete. By adopting wet magnetic separation, it is possible to cover minimum particle size up to about 75 μm, reducing the content of material not subject to purification (about 4% of material has a fraction below 75 μm). Finally, after the magnetic separation, the material mostly consisting of cement is collected and stored for subsequent forwarding to the thermoactivation stage, to obtain recycled cement. Before thermoactivation, the material is ground in a ball mill until its size is reduced to less than 125 μm, in order to enhance its cementitious capacity.

The splitter opening and feed speed can be easily adjusted according to the particle size fraction, conveyor and feeder characteristics, and the size and capacity of the roll used.

Example 2

Figure 4:
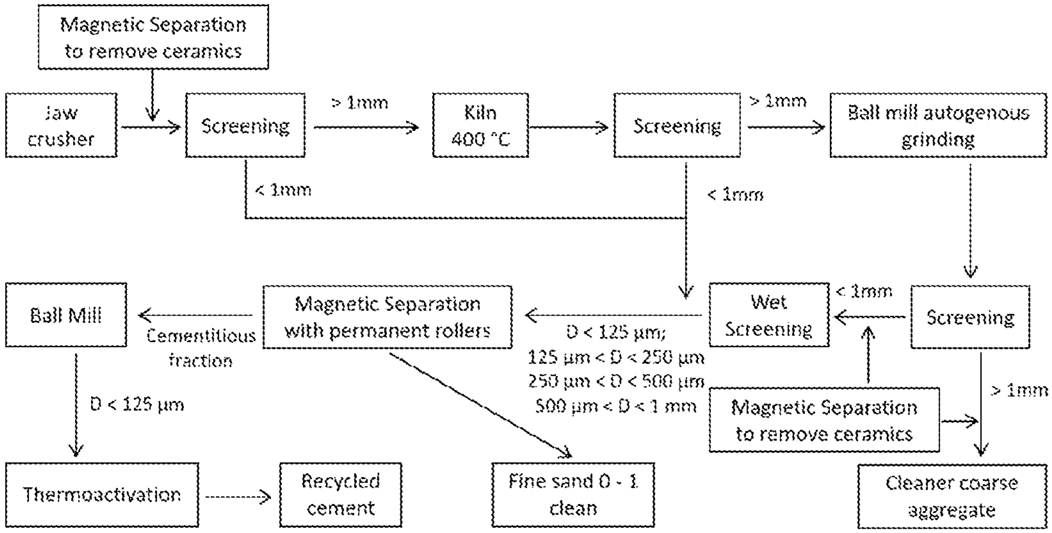
FIG. 4—schematic representation of the separation of the constituents of concrete waste with a view to recovering the aggregates fraction, in addition to the cementitious fraction, as described in example 2 of the detailed description of the invention.

The example described below is shown in FIG. 4 and aims to exploit the aggregates fraction of concrete waste, i.e. it envisages obtaining recycled coarse and fine concrete aggregates in addition to the hardened cement fraction, thus enabling the production of fully recycled concrete at the aggregate and binder level.

The material is therefore initially subjected to a crushing stage, so as to present particles smaller than about 20 mm. Subsequently, if there are residues of ceramic materials, their magnetic separation can be carried out, as performed in the procedure of Example 1. It is also possible to separate the ceramics only at a later stage, as also done in Example 1. After crushing and eventual removal of any ceramic materials, the concrete debris larger than 1 mm is heated at 400° C., for about 2 hours in a rotary kiln (or other type, though the residence time will have to be adjusted to achieve similar efficiency), where the aggregates and the cement matrix are subjected to differential stresses that lead to their separation after cooling. The material obtained is subsequently subjected to autogenous grinding in a horizontal axis mill (without the use of grinding balls), for about 30 minutes, and is then screened in different granulometric fractions, adding the material smaller than 1 mm produced by the crushing: <150 μm; 150-250 μm; 250-500 μm; 500 μm–1 mm; 1-12 mm; >12 mm. It has been found that after thermal treatment and grinding, waste above 12 mm tends to have a lower percentage of particles with little cement contamination, and aggregate cleanliness levels similar to those of the lower fractions are not achieved. In this case, it may be advisable to reduce the aggregate to fractions smaller than 12 mm, or to perform an extra grinding stage in a ball mill in order to achieve higher levels of purification. The fraction larger than 12 mm represents about 30% of the sample. Regarding the fractions between 1 and 12 mm, the aggregate cleaning was quite effective for most of the particles. For the fractions between 2 and 8 mm, the percentage of cement adhered to the aggregates was less than 1% in 84%, 84% and 72% of the particles, in fractions 2-4, 4-6.3 and 6.3-8 mm, respectively. For the 8-12 mm fraction, the percentage of clean particles with less than 1% paste was 62%. Thus, it can at least be assured that more than 80% of the aggregate particles between 1 and 6 mm, more than 70% of those between 6 and 8 mm, and more than 60% of those between 8 and 12 mm, have high quality, and practically no adhered paste (less than 1%).

After this procedure, all material smaller than 1 mm is subjected to the same processes as in Example 1, namely wet screening, magnetic separation, grinding below 125 μm and thermoactivation. The non-magnetic material and any remaining material above 1 mm can be reused as high-quality recycled aggregate. The fraction below 150 μm is smaller in the second procedure, being about 7-8% of the mass of the concrete. Taking into account that this material could contain about 30% cement in its composition, and the amount of cementitious matrix in the original concrete is about 18%, the cement in this non-separated fraction may amount to approximately 10-15% (by mass) of the initial cement in the concrete.

Example 3

In order to confirm the suitability of the proposed procedure, several thermogravimetry (TG), X-ray diffraction (XRD), and microscopic tests were performed to evaluate the yield obtained during the various separation processes. In the 150-500 μm fractions, the separation led to a shift from mixtures with about 20-30% cement to final solutions with about 75-80% cement. In the mixtures with 500-1000 μm the yield was lower, shifting from about 15-20% to about 50-60%, as the maximum desired release did not occur. In this case, two options are suggested: additional grinding of the material above 500 μm to trigger the effective release of the various constituents of the concrete; adopting a more effective release methodology that allows a better yield in the 500-1000 μm fraction. Regarding the material below 150 μm, as mentioned, this cannot be purified by magnetic separation, but it can be used as a mineral addition of lower reactivity (filler).

Figure 5:
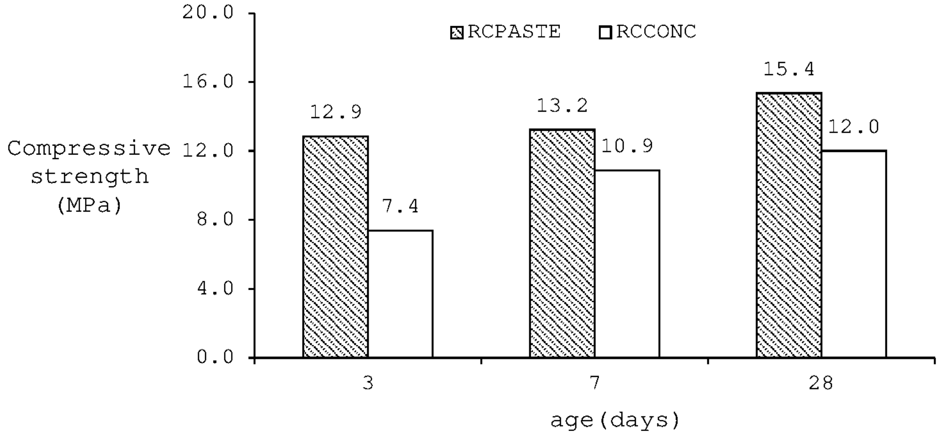
FIG. 5—graphical representation of the compressive strength at 3, 7 and 28 days of age of: mortars with 100% recycled cement from pure pastes (RCPASTE) of similar hydration level to concrete subjected to recycling; mortars with 100% recycled cement from concrete waste (RCCONC) of similar hydration level subjected to the separation procedure according to Example 1 and having identical workability to mortars with RCPASTE.

FIG. 5 shows the compressive strength results at 3, 7 and 28 days of age of mortars of identical workability produced with 100% recycled cement from concrete debris of similar hydration level, subjected to the separation procedure according to example 1 (RCCONC), and produced with 100% recycled cement from pure paste of similar hydration level to the concrete subjected to recycling (RCPASTE). Both mortars were produced with the same weight ratio of 1:3 (binder:sand). Due to the higher water demand of the mortars with RCPASTE, associated with higher recycled cement content, the water/binder ratio (w/b) was 0.73 and 0.90 in the mixtures with RCCONC and RCPASTE, respectively.

The strength results shown in FIG. 5 demonstrate that the separation process will yield binders with 28-days strength of about 78% of that found for the reference mortars with 100% of RCPASTE. The difference in strength is in keeping with the percentage of cement identified in the samples (75-80%). Additionally, it was observed that the thermoactivation of recycled cement allows mechanical strength values at 28 days of about 15 MPa, for poor mortars with w/b of 0.9. In other tests performed for lower w/b ratios, strengths were estimated close to those verified for standard cements of class 32.5, according to EN 197-1 of 2011, defined for standard mortars with w/b of 0.5. This demonstrates the great effectiveness of the present invention, which leads to the production of eco-efficient cements of reasonable performance.

Figure 6:
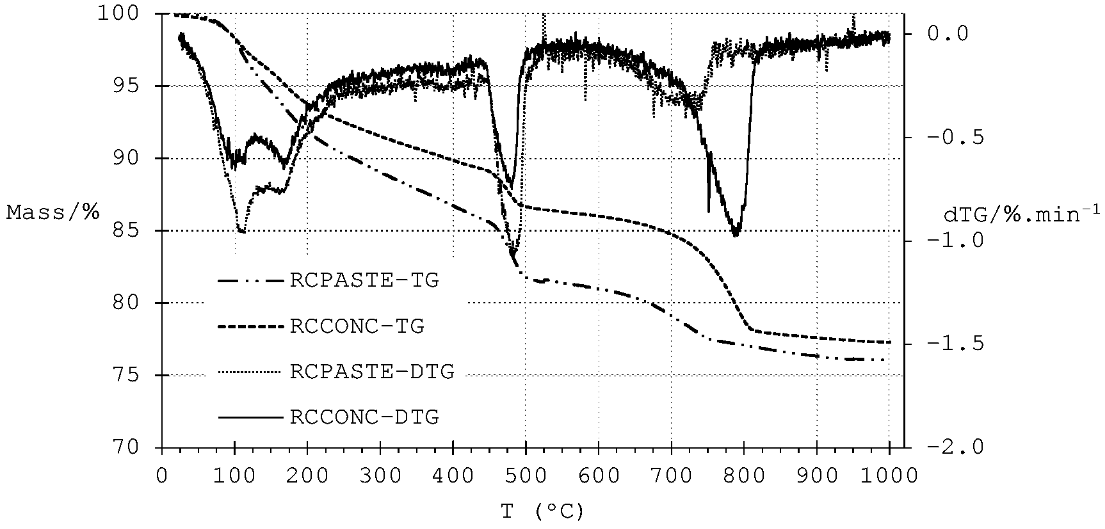
FIG. 6 graphical representation of thermogravimetry (TG) and differential thermogravimetry (DTG) of recycled cement from pastes (RCPASTE) and recycled cement from concrete waste (RCCONC)—fraction 250-500 μm.

FIG. 6 presents the thermogravimetry (TG) and differential thermogravimetry (DTG) of the two cements analysed, RCPASTE and RCCONC. Analysing the combined amount of water between 120 and 400° C., it is estimated that RCCONC contains about 76% of cementitious matrix by mass, while the rest of the material was composed of fine aggregate that was not released or separated.

Figure 7:
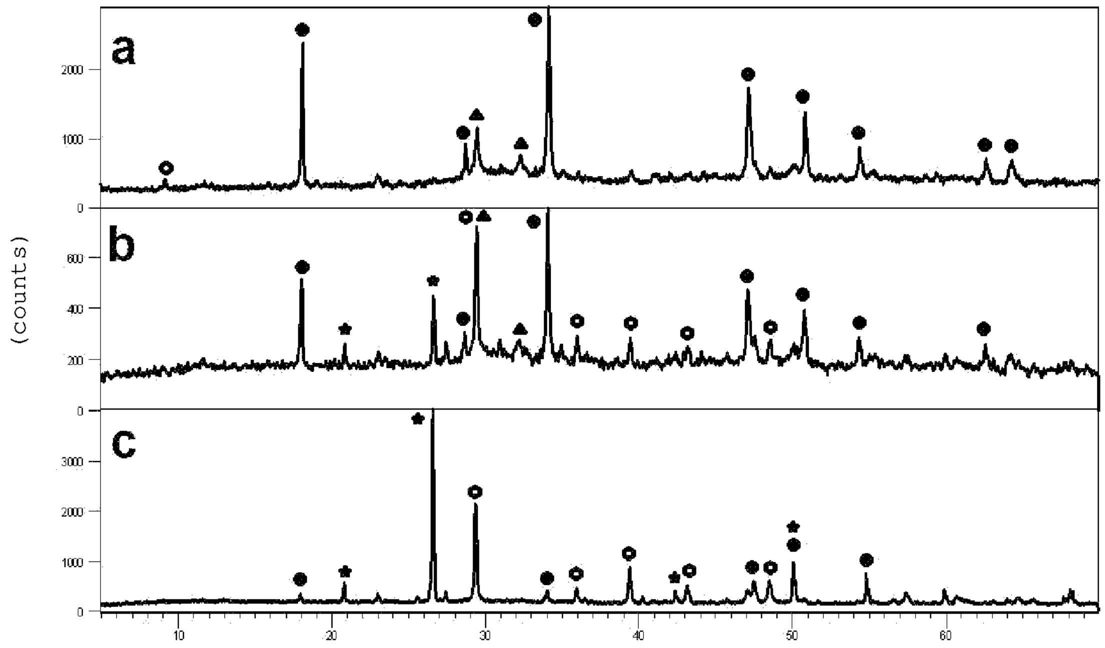
FIG. 7—representative graph of the X-ray diffraction analysis (XRD) of: a) recycled cement from pastes (RCPASTE); b) recycled cement from concrete waste (RCCONC); c) non-magnetic material (aggregate). Open ball-ettringite; Closed ball-portlandite; Open hexagon calcite; star-quartz; triangle-hydrated calcium silicates.

FIG. 7, meanwhile, presents the XRD of the two types of cement, confirming the presence of the same types of majority phases (portlandite, hydrated calcium silicates). The XRD of the non-magnetic separated material is also presented, where the presence of the aggregate crystalline phases (quartz and calcite) and a weak peak corresponding to portlandite are clearly identified. These results help demonstrate the effectiveness of the separation. Compared to the RCPASTE, the RCCONC also exhibits some quartz and slightly higher calcite content, which are associated with aggregate contamination and a higher level of carbonation of the product, arising from the separation procedures.

REFERENCES

[1] Imbabi M S, Carrigan C, McKenna S (2012). Trends and developments in green cement and concrete technology. International Journal of Sustainable Built Environment, 1(2): 194-216.

[2] Kwon E, Ahn J, Cho B, Park D (2015). A study on development of recycled cement made from waste cementitious powder. Constr. Build. Mater, 83: 174-180.

[3] Svoboda J (2004). Magnetic Techniques for the Treatment of Materials. Kluwer Academic Publishers, New York, Boston, Dordrecht, London, Moscow, 649p.

[4] Gopalakrishnan R., Barathan S., Govindarajan D (2012). Magnetic Susceptibility Measurements on Fly Ash Admixtured Cement Hydrated with Groundwater and Seawater. American Journal of Materials Science 2012, 2(1): 32-36.

[5] Lotfi S, Deja J, Rem P, Mróz R, Roekel E. V., Van der Stelt H (2014). Mechanical recycling of EOL concrete into high-grade aggregates. Resources, Conservation and Recycling 87:117-125.

[6] Yoda K, Harada M, Sakuramoto F (2003). Field Application and Advantage of Concrete Recycled Insitu Recycling Systems, London, Thomas Telford Services Ltd, 437-446.

[7] Tateyashiki H, Shima H, Matsumoto Y, Koga Y (2001). Properties of concrete with high quality recycled aggregate by heat and rubbing method, Proc. JCI 23 (2): 61-66.

[8] *Sui* Y., Mueller A. (2012). Development of thermomechanical treatment for recycling of used concrete. Mater. Struct. 45 (10): 1487-1495.

[9] Al-Bayati H. K. A, Das P, Tighe S, Baaj H (2016). Evaluation of various treatment methods for enhancing the physical and morphological properties of coarse recycled concrete aggregate. Construction and Building Materials 112: 284-298.

[10] Mulder E, Jong T, Feenstra L (2007). Closed Cycle Construction: An integrated process for the separation and reuse of C&D waste. Waste Management 27 (2007) 1408-1415.

[11] Lippiatt N, Bourgeois F (2012). Investigation of microwave-assisted concrete recycling using single-particle testing. Minerals Engineering, Elsevier, 2012, Vol. 31, pp. 71-81.

[12] Akbarvezhad A (2013). Separation processes to improve the quality of recycled concrete aggregates (RCA). In Handbook of recycled concrete and demolition waste, Woodhead Publishing Limited. Chapter 10: 246-269.

Lisbon, 19 Mar. 2021.

The invention claimed is:

1. A process of separating the components of hardened concrete waste to obtain a recycled cement with the said concrete resulting from construction and demolition waste including cementitious material characterised by comprising the following steps:

a) carrying out at least one stage of crushing the hardened concrete waste until a crushed material is obtained whose size is between 20 and 32 mm;

b) screening the crushed material resulting from step a) with separation of material smaller than 1 mm;

c) fragmenting the material larger than 1 mm resulting from step b) until at least 90% of the material smaller than 1 mm is obtained;

d) screening the material resulting from step c) in granulometric fractions between 150 μm and <1 mm;

e) magnetic separation of material resulting from step d) larger than 150 μm by at least one pass through a magnetic separator having a magnetic field of at least 1 T to obtain a cementitious fraction separated on the basis of the paramagnetic characteristics of the cementitious material;

f) grinding the cementitious fraction resulting from the magnetic separation of step e) to a size less than 125 μm;

g) thermoactivation of the material obtained in step f) to obtain recycled cement.

2. The separation process according to claim 1 characterised in that the material in step c) is fragmented by mechanical treatment through at least one cycle of grinding until a yield of more than 90% of the material smaller than 1 mm is achieved.

3. The separation process according to claim 1 characterised in that the material in step c) is fragmented by means of a heat treatment, such that after cooling, the material subjected to the heat treatment is subjected to at least one grinding cycle.

4. The separation process according to claim 3 characterised in that the heat treatment takes place at 400° C. for 2 hours and the grinding is autogenous and carried out in a horizontal axis mill for 30 minutes.

5. The separation process according to claim 1 characterised in that the material screened in step d) is subjected to a further wet screening cycle followed by drying.

6. The separation process according to claim 1 characterised in that the material resulting from the screening of step d) is magnetically separated by at least two passes through the magnetic separator.

7. The separation process according to claim 1 characterised in that after at least one step of crushing the concrete waste according to step a), magnetic separation of ceramic waste with paramagnetic characteristics occurs.

8. The separation process according to claim 1 characterised in that the screened material resulting from the fragmentation in step c) is subjected to magnetic separation of ceramic residues by at least one pass through the magnetic separator.

9. The separation process according to claim 1 characterised in that the magnetic separation is performed dry using permanent rolls (4) made from rare-earth magnets.

10. The separation process according to claim 9 characterised in that the permanent rolls (4) are sequentially arranged and comprise discs or rings of permanent magnets interrupted at intervals with steel discs, the rings being positioned with faces of the same polarity side by side.

11. The separation process according to claim 9 characterised in that the diameter of the permanent rolls (4) is greater than 76 mm and up to 300 mm.

12. The separation process according to claim 9 characterised in that the magnetic separation is performed through a conveyor screen (3) with a thickness of less than 2 mm and with a minimum thickness of 0.12 mm.

13. The separation process according to claim 9 characterised in that the rare-earth magnets are made of Neodymium-iron-boron.

14. The separation process according to claim 1 characterised in that the magnetic separation in step e) is performed by induced rollers, by high intensity and gradient wet magnetic separators or by other means of magnetic separation.

* * * * *